I. E. Palmer,
Mosquito Net
No. 1,816. Reissued Nov. 8, 1864.
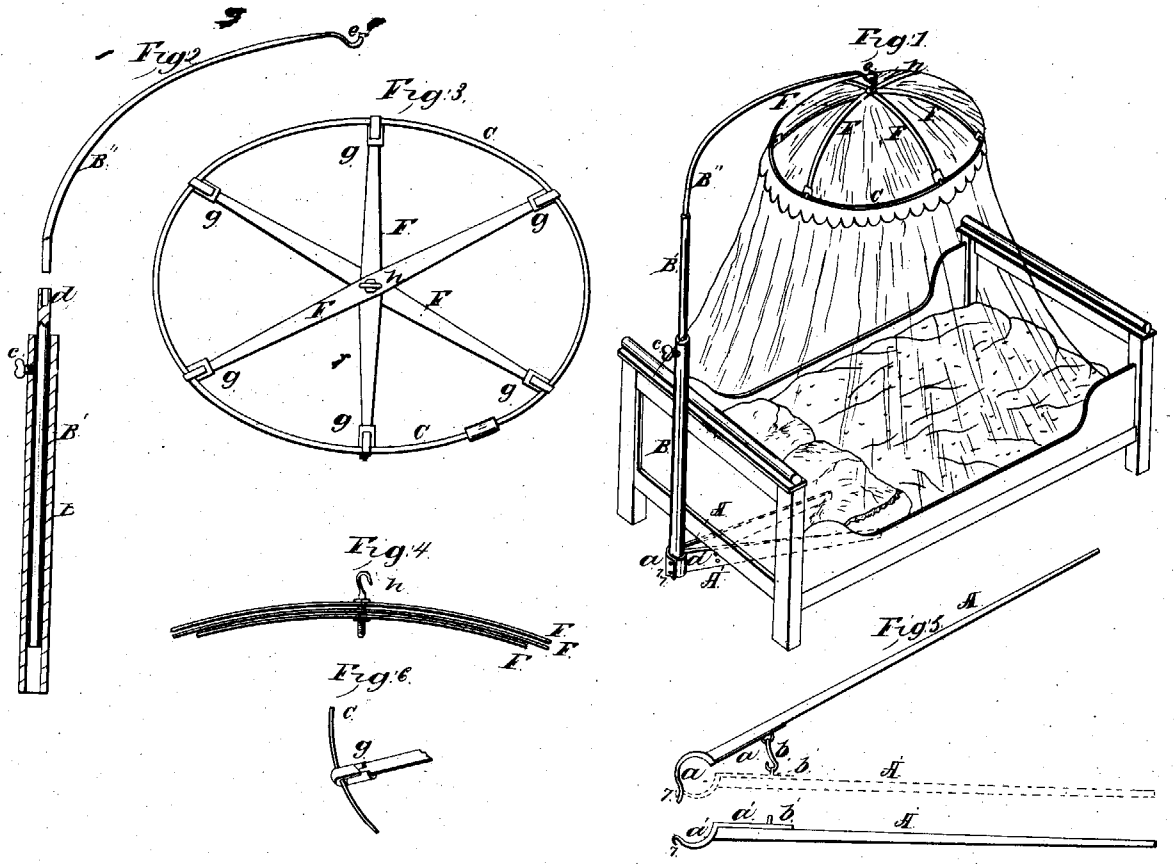
Witnesses:
Henry T. Brown
J. W. Coombs.
Inventor:
Isaac E. Palmer.

UNITED STATES PATENT OFFICE.

ISAAC E. PALMER, OF MIDDLETOWN, CONNECTICUT.

IMPROVED BED-CANOPY.

Specification forming part of Letters Patent No. 27,007, dated January 31, 1860; Reissue No. 1,816, dated November 6, 1864.

*To all whom it may concern:*

Be it known that I, ISAAC E. PALMER, formerly of Montville, in the county of New London and State of Connecticut, and now of Middletown, in the county of Middlesex and Sate aforesaid, have invented certain new and useful Improvements in Portable Canopies for Bedsteads; and I do hereby declare that the following is a full, clear, and exact description of the same, reference being had to the accompanying drawings, forming part of this specification, in which—

Figure 1 is a perspective view of a couch having my improved portable canopy applied. Fig. 2 is an elevation, partly in section, of the standard from which the extending frame of the canopy is suspended. Fig. 3 is a plan of the extending frame of the canopy, showing it extended. Fig. 4 is a side view of the folding portion of the frame, showing it shut up for transportation. Fig. 5 is a plan of the base which supports the standard from which the extending frame is suspended. Fig. 6 is a perspective view of the joint between one of the arms and the hoop of the canopy.

Similar letters of reference indicate corresponding parts in the several figures.

This invention consists, first, in supporting the standard from which the extending frame of the canopy is suspended in a base constructed of two pieces so connected as to grasp firmly the lower part of the said standard.

It consists, secondly, in a novel construction of the extending frame of the canopy, by which strength is obtained with lightness, and which provides for its folding up in a compact and portable form.

To enable others skilled in the art to make and use my invention, I will proceed to describe its construction and operation.

A A′, Figs. 1 and 5, represent the two pieces of which the base is composed. These I prefer to make of two taper pieces of board set up edgewise. They are united at their thicker end, and their union is represented as being accomplished by a hinge formed of two straps of metal, *a a′*, which are secured firmly one to each of the two pieces.

One or more hooks, 7, are formed on the projecting extremity of one of the straps, *a′*, and a corresponding number of eyes in the other one for the reception of the said hook or hooks, the said hook or hooks and eye or eyes forming a connecting hinge, which admits of the two pieces A A′ being disconnected, to enable them to be packed closely together for transportation. In Fig. 5 the piece A′ is shown in red outline connected with A, and in black outline disconnected therefrom. The portions of the straps *a a′* back of the hooks and eyes are curved in a nearly semicircular or other suitable form, so that the two, when connected, combine to form a socket-clamp for the reception of the lower part, B, of the standard, and will clamp the said part of the standard tightly when the two pieces A A′ are at a suitable angle to each other to form a suitable base for the support of the standard and suspended canopy.

*b b′* is the fastening by which the two pieces A A′ are connected at a distance from the clamp, for the purpose of holding the clamp tight upon the standard. This fastening is represented as consisting of a hook, *b*, attached to the piece A, and a staple or eye, *b′*, secured in the piece A′.

The standard is represented as composed of three pieces—viz., a hollow shaf tor stem, B, a solid or hollow rod, B′, of about the same length fitted thereinto, and a curved rod, B″, of crane-neck form, the lower part of which is fitted into a socket formed in the upper part of B′, and the upper part is made with a hook, *e*, for the suspension of the extending frame of the canopy. These pieces B B′ B″ can be disconnected for packing. The piece B′ is capable of sliding up and down to the extent of its whole length within the piece B, for the purpose of varying the height of the standard, and a set-screw screws into a tapped hole in B for the purpose of securing B′ at any height desired.

The length of the pieces A A′ must be such that when the standard is erected and clamped in the base, and the extending frame and canopy are suspended therefrom, the center of gravity of the whole will be sufficiently within the disconnected ends of the said pieces A A′ to enable them to form a firm base which will not easily be overturned.

The canopy-frame is represented in Figs. 1 and 3 of elliptical form when spread out; but it might be circular or polygonal form. It is also represented as convex on top. It is composed of a series of light ribs, F F, of wood or other material, crossing each other at the center, a connecting pivot-screw, *h*, which passes through the said ribs at the center, and is fitted with a nut to hold the said ribs together, and a hoop or band, C, of wire or other material, which connects the ends of the ribs. The screw *h* is made with a hook or eye at the top, to enable the frame to be suspended from the hook *e* at the top of the standard.

The hoop or band C is secured to the ends of the ribs F F by means of clasps *g g*, (shown in Figs. 1, 3, and 6,) which admit of its being readily attached and detached to permit the folding and extension of the frame. These clasps are struck out of sheet metal in a T-shaped form, and by bending over the opposite ends or lips a socket will be formed for receiving one end of a rib, F. The remaining lip is bent over the hoop or band C, and thus attaches it to the rib sufficiently secure to support the weight of the mosquito-net or other covering of the canopy, which is shown in Fig. 1 in red outline. Before the hoop or band is attached to, or after its removal from, the ribs the ribs can be turned on the screw *h* and brought in line with each other, as shown in Fig. 4, to enable them to be packed in a compact form.

What I claim as my invention, and desire to secure by Letters Patent, is—

1. The combination of the grasping-base A A′ *a a′* with the standard, substantially as herein described, irrespective of the construction of the standard.

2. The extending frame of the canopy, consisting of ribs F F, pivoted at their center, and a hoop or band, C, connected to said ribs by metal clasps, all combined substantially as herein specified.

ISAAC E. PALMER.

Witnesses:

HENRY T. BROWN,
J. W. COOMBS.